United States Patent
Brachet

(10) Patent No.: US 12,258,986 B2
(45) Date of Patent: Mar. 25, 2025

(54) INSERTABLE CLAMP WITH ALIGNED CLIP

(71) Applicant: LISI AEROSPACE, Paris (FR)

(72) Inventor: Julien Brachet, Mehun sur yèvre (FR)

(73) Assignee: LISI AEROSPACE, Paris (FR)

( * ) Notice: Subject to any disclaimer, the term of this patent is extended or adjusted under 35 U.S.C. 154(b) by 960 days.

(21) Appl. No.: 17/146,872

(22) Filed: Jan. 12, 2021

(65) Prior Publication Data

US 2021/0215183 A1 Jul. 15, 2021

(30) Foreign Application Priority Data

Jan. 13, 2020 (FR) ...................................... 2000263

(51) Int. Cl.
   *F16B 19/10* (2006.01)
   *B23P 19/04* (2006.01)

(52) U.S. Cl.
   CPC ............ *F16B 19/109* (2013.01); *B23P 19/04* (2013.01)

(58) Field of Classification Search
   CPC ....... B25B 31/005; B23P 19/04; F16B 19/109
   USPC .......... 29/252, 255, 278, 244; 269/48.1–48.4
   See application file for complete search history.

(56) References Cited

U.S. PATENT DOCUMENTS

| | | | | |
|---|---|---|---|---|
| 2,241,609 A * | 5/1941 | McClelland | .......... | B25B 31/005 269/48.4 |
| 2,294,013 A * | 8/1942 | Wallace | ................ | B25B 31/005 269/48.4 |
| 2,317,315 A * | 4/1943 | Wallace | ................ | B25B 31/005 24/453 |
| 2,439,531 A * | 4/1948 | Wallace | ................ | B25B 31/005 269/48.4 |
| 2,775,155 A * | 12/1956 | Tompkins | ............. | B25B 31/005 269/48.3 |

(Continued)

FOREIGN PATENT DOCUMENTS

| EP | 0198105 A1 * | 10/1986 |
|---|---|---|
| EP | 0336808 A1 | 8/1994 |
| FR | 3014969 A1 | 6/2015 |

OTHER PUBLICATIONS

Medjdoub, Karim, French Preliminary Search Report, Oct. 5, 2020, 8 pages, French Institute of Intellectual Property, Courbevoie, France.

*Primary Examiner* — Joel D Crandall
*Assistant Examiner* — Jonathan R Zaworski
(74) *Attorney, Agent, or Firm* — Henricks Slavin LLP

(57) ABSTRACT

Insertable clamp, for the temporary assembly of structural parts, including a main tubular body extending along a longitudinal axis X and a bearing surface intended to contact a first face of the structural parts, an elastic clip capable of passing through drilled aligned holes, produced in said parts, the clip being moveable along the longitudinal axis, rotatable about said axis of a driver nut provided with a tapped bore cooperating with a threaded end of said clip, the clip comprising two branches having hooking spurs for contacting with a last face of the structural parts, said branches transversally and progressively moving apart along a spreader, between said branches and fixed in relation to the main body, when exposed to the recoil of the clip, the clamp further includes a compression spring inside the body and holding the threaded end engaged in the tapped bore so the clip remains aligned with the longitudinal axis.

11 Claims, 4 Drawing Sheets

(56) References Cited

U.S. PATENT DOCUMENTS

| | | | | |
|---|---|---|---|---|
| 3,139,785 A * | 7/1964 | Harwood | B25B 31/005 | 269/48.3 |
| 3,196,734 A * | 7/1965 | Finkle | F16B 5/06 | 269/48.4 |
| 3,202,037 A * | 8/1965 | Finkle | B25B 31/005 | 269/48.3 |
| 3,233,504 A * | 2/1966 | Jones | B25B 31/005 | 269/48.3 |
| 3,260,151 A * | 7/1966 | Jones | B25B 31/005 | 269/48.3 |
| 3,568,562 A * | 3/1971 | Harwood | B25B 31/005 | 269/254 R |
| 4,459,728 A * | 7/1984 | Gaquere | B25B 31/005 | 29/243.523 |
| 4,537,542 A * | 8/1985 | Pratt | F16B 19/109 | 24/607 |
| 4,548,533 A * | 10/1985 | Pratt | F16B 19/109 | 24/607 |
| 4,725,162 A * | 2/1988 | Haller | F22B 37/005 | 165/11.2 |
| 4,936,726 A * | 6/1990 | Medard | F16B 19/109 | 24/453 |
| 5,042,787 A * | 8/1991 | Duffaud | B21J 15/42 | 269/48.4 |
| 5,048,805 A * | 9/1991 | Wiseman | B21J 15/42 | 269/48.4 |
| 5,228,731 A * | 7/1993 | Glass | F16B 19/109 | 411/79 |
| 5,240,361 A * | 8/1993 | Armstrong | F16B 19/109 | 269/48.2 |
| 8,448,929 B2 * | 5/2013 | Prot | B25B 31/005 | 269/48.2 |
| 8,869,372 B2 * | 10/2014 | Luneau | B21J 15/043 | 269/95 |
| 8,955,714 B1 * | 2/2015 | Brzon | B21J 15/142 | 206/499 |
| 10,982,701 B2 * | 4/2021 | McClure | F16B 19/109 | |
| 2004/0164475 A1 * | 8/2004 | Anderson | B64F 5/10 | 269/49 |
| 2016/0312815 A1 * | 10/2016 | Bigot | F16B 19/109 | |

* cited by examiner

INSERTABLE CLAMP WITH ALIGNED CLIP

TECHNICAL FIELD

The present invention relates to the field of mechanical fasteners, in particular temporary fasteners so-called insertable clamps, and more particularly relates to an insertable clamp with a fixed spreader comprising a spring for the alignment of its clip with the longitudinal axis of its main body.

The present invention is directly applicable in the assembly of structures, such as plates, in the aeronautical industry for example.

PRIOR ART

It is customary, before performing the final fastening of plates or metal sheets by riveting for example, to carry out a temporary assembly of the plates using insertable clamps passing through aligned holes made in said plates so as to hold them in position. This assembly method is particularly used in aeronautical construction, in particular during joining operations between the wings and the fuselage of an aircraft.

Assembly clamps with fixed spreaders, such as described in document U.S. Pat. No. 2,775,155, generally comprise a body provided with a bearing surface intended to come into contact with the outer face of one of the outer parts of a temporary assembly, a rod leading to the bearing surface of the body to engage in the aligned holes, an expandable elongated element such as an elastic clip associated with the rod, passing through the aligned holes and provided at its free end with at least one hooking spur, and a control mechanism intended to cause a relative movement between said expandable elongated element and the body.

Thus, under the action of the control mechanism, the expandable elongated element moves backward along the rod by progressively spreading apart, under the action of a fixed spreader in relation to the body, until the flat rear face of the hooking spur applies against the outer face of the other outer part, at the border of the hole corresponding thereto. The parts are then firmly pressed against one another between the bearing surface of the body and the rear face of the hooking spur of the expandable elongated element.

Although these insertable clamps are widely used and provide satisfaction with regards to the holding in position of the parts to be clamped, they have certain disadvantages.

Indeed, the existing clamps have a problem of misalignment of the clips with the axis of the body thus complicating their insertion into the structures to be assembled and/or their removal. In addition the existing clamps have fairly large diameters that make their use delicate when a plurality of clamps must be inserted into closely grouped drilled holes.

DESCRIPTION OF THE INVENTION

The present invention aims to overcome the disadvantages of the prior art, in particular the problem of misalignment of the clips in relation to the body of the clamp.

To this end, the present invention relates to an insertable clamp, for the temporary assembly of at least two drilled structural parts, including a main tubular body extending along a longitudinal axis X and having a bearing surface intended to come into contact with a first face of the structural parts, an elastic clip capable of passing through aligned drilled holes, produced in said parts, the clip being translationally moveable along the longitudinal axis, driven by the rotation about said axis of a driver nut provided with a tapped bore cooperating with a threaded end of said clip, the clip comprising two branches each ending by a hooking spur intended to come into contact with a rear face of the structural parts, said branches transversally and progressively moving apart along a spreader, placed between said branches and fixed in relation to the main body, when exposed to the backward motion of the clip. The clamp according to the invention is remarkable in that it includes a compression spring placed inside the main body and holding the threaded end partially engaged in the tapped bore, by exerting a force along the longitudinal axis X tending to push back the threaded end towards the end of the main body opposite the bearing surface, so that the clip remains constantly aligned with the longitudinal axis.

According to one advantageous embodiment, the threaded end has an annular edge against which the spring is exerted.

More particularly, a thrust washer is inserted between the annular edge and the spring.

Advantageously, the bearing surface corresponds to a substantially flat annular surface of a collar interlocking by clipping into the main body.

According to one embodiment, the clamp further includes a central part placed inside the main body, perpendicular to the longitudinal axis X, and rotationally and translationally locked in relation to said body, the central part receiving in a groove a transverse end of the spreader, the spreader having a T-shape.

More particularly, the compression spring is placed constrained between the central part and the annular edge of the threaded end or the washer.

According to one embodiment, the main body comprises at one of its ends, intended to come into contact with the parts to be assembled, a housing capable of translationally and rotationally locking at least one collar fit together by clipping into the main body.

More particularly, the housing includes at least one notch extending parallel to the longitudinal axis X, a base of said notch extending perpendicular to the longitudinal axis X.

According to one embodiment, the central part has a regular polygonal shape whereof each corner is inserted into a notch of the housing, said central part abutting against bases of the notches.

Advantageously, the driver nut is mounted in the main body by a pivot connection of axis X, said driver nut being translationally locked in the main body.

In the clamp according to the invention, the threaded end remains constrained by the spring while not fully threaded in the tapped bore of the driver nut.

The basic concepts of the invention having been disclosed above in their most elementary form, other details and features will become more apparent upon reading the following description and with regard to the appended drawings, giving by way of non-limiting example an embodiment of an insertable clamp in accordance with the principles of the invention.

DESCRIPTION OF THE DRAWINGS

The various figures and the elements of the same figure are not necessarily to scale. In the set of figures, identical or equivalent elements bear the same numerical reference.

Thus, it is illustrated in.

DETAILED DESCRIPTION OF EMBODIMENTS

In the embodiment described hereafter, reference is made to an insertable clamp intended mainly for the temporary assembly of at least two drilled parts, of plate type, in the aeronautical and space industry. This non-limiting example is given for better understanding of the invention and does not exclude its use on other types of structures in related industries such as the automobile industry.

In the remainder of the description, the term "clamp" is used to designate an insertable clamp for the temporary assembly of drilled structures.

Figure 3:
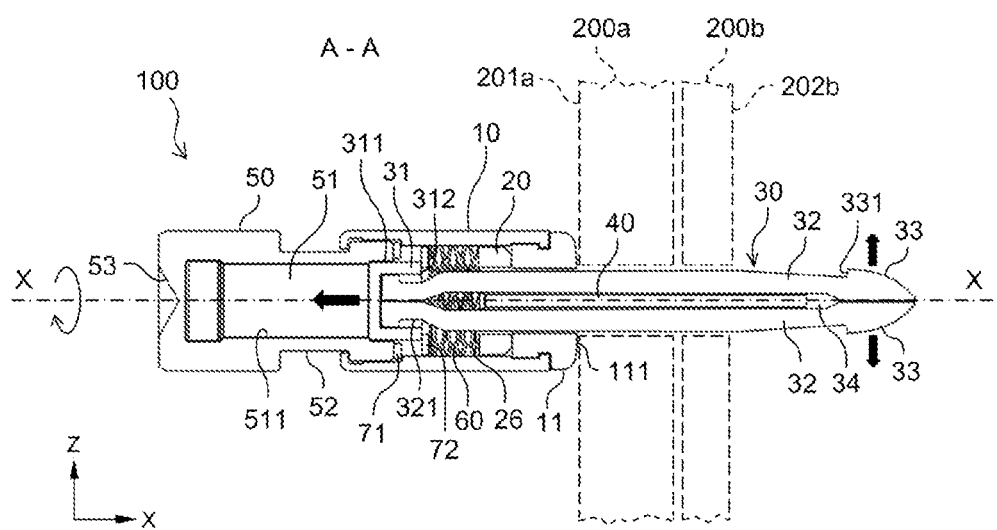
FIG. 3: a sectional view of the clamp of FIG. 1, in initial position in an assembly of parts.

FIG. 3 shows in sectional view a clamp 100 including a main body 10, wherein operates a major portion of the actuation mechanism of the clamp, a central part 20, coaxially inserted inside the main body and rotationally locked in relation thereto, a clip 30, passing through the central part and extending outside of the main body along its longitudinal axis X, a spreader 40, fixed in relation to the main body and making it possible to open the clip when the mechanism of the clamp is actuated, a driver nut 50, actuating said mechanism by a rotation about the longitudinal axis of the main body, and a spring 60, placed inside the main body and providing a permanent alignment of the clip 30 with the longitudinal axis of said body as explained further.

The clamp 100 makes it possible to temporarily assemble at least two drilled parts 200a and 200b, by pressing them firmly against one another, by the compression of said parts between the main body 10 and the clip 30, said clip passing through aligned holes produced in said parts. The resulting compressive stress is controlled by the tightening of the clamp.

Figure 4:
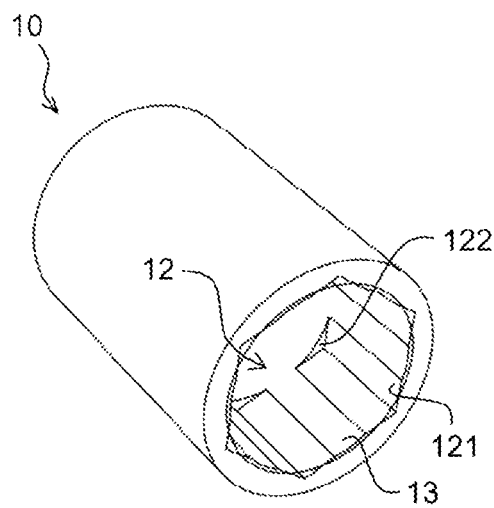
FIG. 4: a perspective view of the main body of an insertable clamp according to the invention.

The main body 10, with reference to FIG. 4, is tubular, has a roughly cylindrical shape with circular base and includes at one of its ends, so-called "front end" because intended to come into contact with the parts to be assembled, a collar 11 fastened in a housing 12 of said body, said housing being shaped to also receive the central part 20 and rotationally lock it. The housing 12 includes to this end a shape capable of translationally and rotationally locking the collar 11 and the central part 20. Thus, in the example in FIG. 4, the housing 12 comprises peripheral notches 121 machined in the bore 13 of the body, of prismatic shape and each having a base 122 defined by the removal of material on the bore. Furthermore, each notch 121 has an axis substantially parallel to the longitudinal axis X of the main body 10. Therefore, the notches 121 make it possible to translationally guide the collar 11 and the central part 20 during their insertions into the housing 12 of the main body 10, while making it possible to insert other elements of the clamp into the main body 10, by the front end. The housing 12 may have other shapes making it possible to rotationally lock the collar 11 and the central part 20, by means of lobes or ribs, hollow or protruding in relation to the bore of the main body. The translational locking may be performed for example by a wall extending perpendicular to the longitudinal axis X, occasionally distributed or in the form of a continuous shoulder, or by the addition of an elastic element elastically engaged in a recess produced in the bore of the main body, and radially extending inwardly over a sufficient distance in order to obstruct the central part 20 and provide its translational locking.

The central part 20 is also translationally immobilized along the axis X, abutting against the bases 122 of the notches 121 and a rear face of the collar 11.

The collar 11 may for example be interlocked by clipping or clicking together at the end of the main body 10, and defines an annular and preferably flat bearing surface 111, in order to improve the contact with the parts to be assembled.

Figure 5:
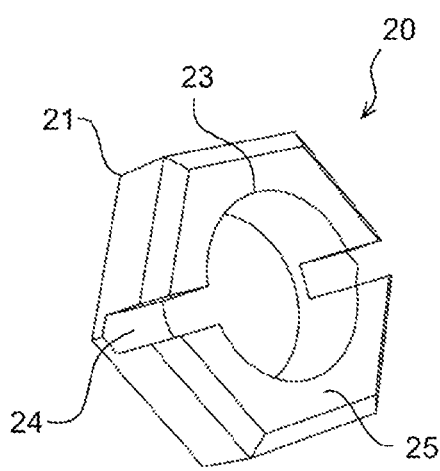
FIG. 5: a perspective view of the central part of an insertable clamp according to the invention.

The central part 20, with reference to FIG. 5, has a polygonal flat shape, preferably regular, whereof the number of vertices 21, materialized by corners, corresponds to the number of notches 121 of the housing 12 arranged in the main body 10. Thus, each corner 21 comes to rest on the base 122 of a notch 121 so as to perform an interlocking between the central part 20 and the main body 10. This mounting makes it possible to rotationally lock the central part 20 in relation to the main body 10, with an improved stability while limiting the wear of the surfaces in contact, as opposed to a locking on a smooth bore without notches.

In the example of embodiment illustrated, the central part 20 has a regular hexagonal outer shape and comprises a through-hole 23 making possible the passage of the clip 30.

The central part 20 further includes a diametrical groove 24 that makes it possible to rotationally immobilize the spreader 40, said spreader having a T-shape. The groove 24 is produced on a front face 25 of the central part 20 and extends perpendicular to the longitudinal axis X. The central part 20 also has a bearing surface 26 opposite the front face 25.

The clip 30, according to the example of embodiment illustrated, is of elastic nature and includes a threaded end 31 initially placed inside the main body 10, two branches 32 each of which ends with a protruding rounded end 33, the two rounded ends 33 forming a hooking spur, hereafter referenced 33.

The threaded end 31, shown in sectional view in FIG. 3, has a hollow cylindrical shape, open at one end and closed by a bottom at the opposite end, and includes a thread 311 on its outer lateral surface. The open end defines an annular edge 312, whereon rests a washer 72. The washer 72 has an outside diameter less than the inside diameter of the main body 10, and an inside diameter sufficient for making possible the passage of the branches 32 of the clip 30. The washer 72 is thus capable of sliding into the body 10.

The threaded end 31 holds the two branches 32 so that they are embedded at the bottom and elastically free at the opening of said threaded end. To this last end, each branch 32 of the clip 30 has a local concavity 321 opposite the lateral wall of the threaded end 31 so as to define a spacing between said wall and the branches 32 at rest, for a mobility of said branches when moving them apart.

Each branch 32 of the clip 30 is turned back from its local concavity 321 and extends, along the axis X of the main body 10, until the hooking spur 33.

The hooking spur 33, as highlighted above, consists of two rounded ends of the branches 32, each of said ends has a flat face, the two flat faces are applied against one another when the clip 30 is closed (position at rest), and spaced apart when the clip is open (constrained position). The hooking spur 33 has a hooking surface 331 at its junction with the branches 32, said surface is intended to come into contact with the parts to be assembled when the clamp 100 is sufficiently tightened. This hooking surface 331 is annular and, preferably, flat to avoid damaging the surfaces on contact.

The two branches 32 of the clip 30 are spaced apart, both at rest and when constrained, and define a slot 34 wherein the spreader 40 is placed.

Figure 6:
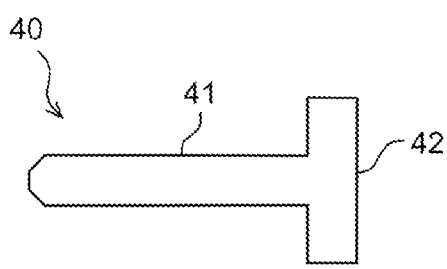
FIG. 6: the T-shaped spreader of an insertable clamp according to the invention.

The spreader 40, with reference to FIG. 6, is a T-shaped rod including a longitudinal portion 41 and a transverse portion 42. The longitudinal portion 41 has a length less than the length of the branches 32 of the clip 30 and is disposed in the slot 34 between said branches. The transverse portion 42 is for its part placed in the diametrical groove 24 of the central part 20 so that it is rotationally locked, to the nearest functional clearance, in relation to said part and, thereby, in relation to the main body 10.

Figure 7:
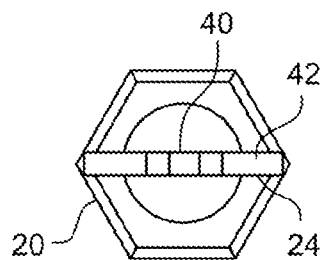
FIG. 7: a front view of the spreader mounted in the central part.

FIG. 7 shows in front view the spreader 40 in place in the central part 20, the transverse portion 42 being introduced into the diametrical groove 24.

The spreader 40, fixed in relation to the main body 10, makes it possible to open the clip 30 by moving the branches 32 apart from one another when exposed to a movement, more specifically a removal, of said clip in relation to the main body. This movement is produced by the actuation of the driver nut 50 that constitutes the member for controlling the clamp 100.

The driver nut 50, according to the example of embodiment illustrated, has a roughly cylindrical shape with circular section of varying diameter, the diameter being larger at the free end of the driver nut, which corresponds to a manual gripping zone by the user, in order to reduce the tightening or at the very least pre-tightening force necessary before using tools. This varying section defines a recess 52 upstream of the main body 10, between the free end of the driver nut and its opposite end translationally locked inside said body. Indeed, the driver nut 50 is mounted, in the main body 10, rotationally free about the longitudinal axis X of said body while being translationally locked between an abutment 71 and the flaps of the main body 10 that come to latch on a shoulder of the recess 52. Thus the driver nut 50 and the main body 10 are mounted in pivot connection of axis X. The driver nut has a constant overall length out of the main body, which speeds up the installation of a plurality of clamps on a structure or a drilling grid by a robot, the latter not having to identify any obstacles or modify its path to avoid them. Furthermore, the abutment 71 may advantageously constitute a sliding member in order to facilitate the rotation of the driver nut 50 in the main body 10.

The driver nut 50 mainly includes a tapped bore 51 provided with an internal thread 511 for cooperating with the threaded end 31 of the clip 30. Indeed, the rotation of the driver nut 50 produces a screwing or an unscrewing, according to the direction of said rotation, of the clip 30 in the bore 51 of said driver nut. In addition the threaded end 31 of the clip 30 is held engaged in the bore 51 by means of the spring 60, placed around the branches 32 between the central part 20 and the annular edge 312 of said threaded end as shown in FIG. 3.

Figure 10:
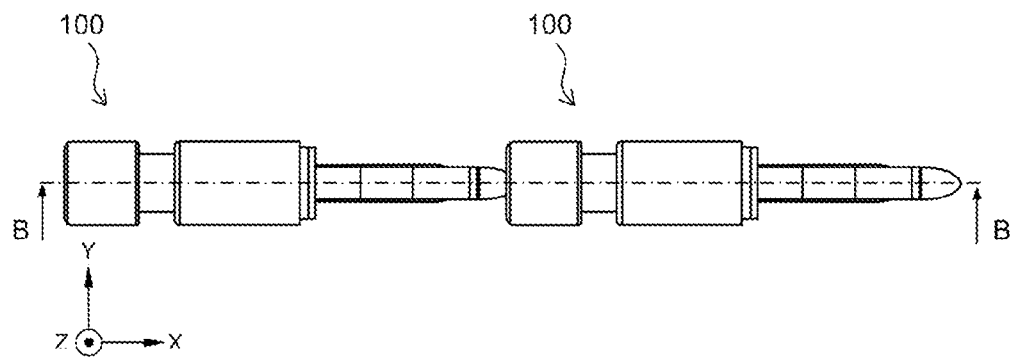
FIG. 10: a top view of two clamps one behind the other, the clip of a clamp engaging in the indentation of the other.
Figure 11:
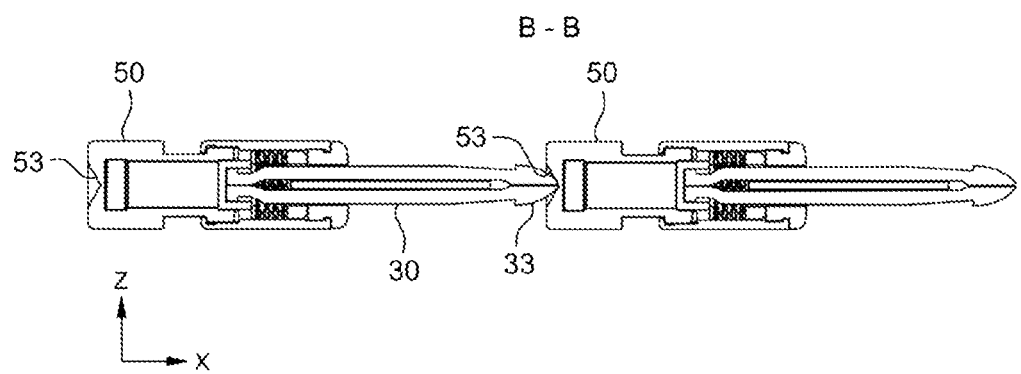
FIG. 11: a sectional view of the clamps of FIG. 10.

The driver nut 50 includes at its closed end an indentation 53 adapted to receive the clip of another clamp. Indeed, when a plurality of clamps are transported by a pipe one behind the other, as shown in FIGS. 10 and 11, the indentation 53 makes it possible to center the clamps in the pipe.

According to the example of embodiment illustrated, the indentation is a cone of angle α, for example 120°, and of axis substantially identical to the longitudinal axis X of the clamp. The shape of the indentation may vary in order to adapt to other shapes of clips.

The spring 60 is disposed in the main body 10 between the central part 20 and the washer 72. The spring 60 is advantageously a compression spring permanently exerting a force along the longitudinal axis X tending to push back the clip 30, via its threaded end 31, in the direction of the removal, namely towards the bore 51 of the driver nut 50, when said end is not totally introduced into said bore. This force also has the advantage of centering and engaging the threaded end 31 at the entrance of the tapped bore 51. This has the effect of advantageously preserving a substantially constant alignment of the clip 30 in the clamp 100, compared to a clamp of the prior art that does not possess any retaining means exerting on the threaded end 31. More specifically, the longitudinal axis of the clip 30 and the longitudinal axis X of the main body 10 remain substantially identical, thus facilitating the insertion and the removal of the clamp 100 in the holes of the structures to be assembled.

Figure 1:
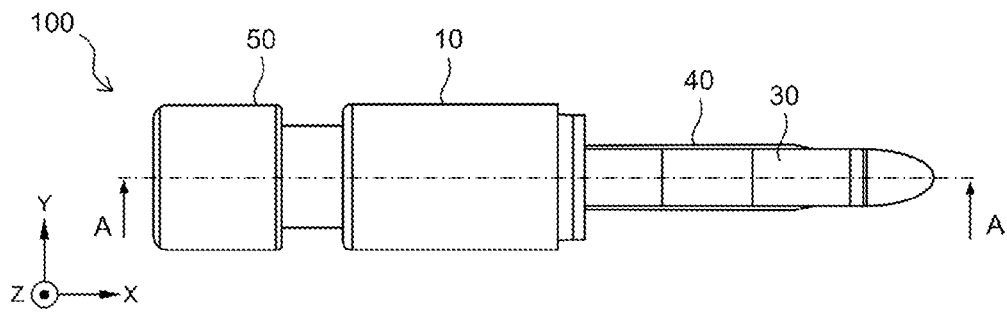
FIG. 1: a top view of an insertable clamp according to the invention, in a first configuration.
Figure 2:
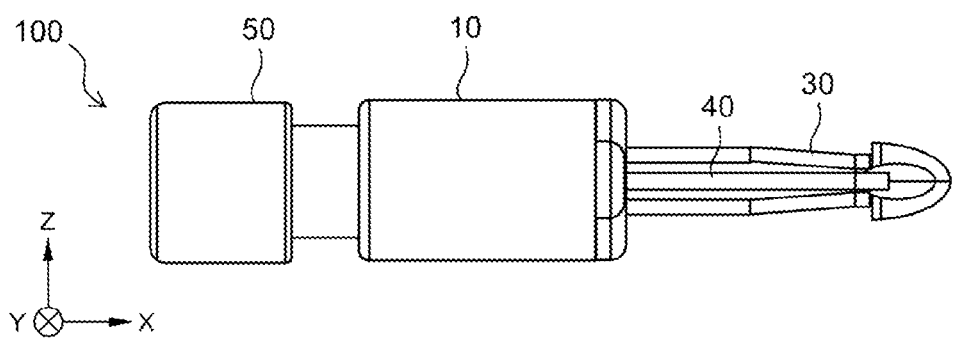
FIG. 2: a side view of the clamp of FIG. 1 in a second configuration.

It should be noted that the problem of misalignment of the clip relates mainly to the so-called "flat" clips, as opposed to cylindrical clips, when they are introduced into circular fastening holes. The clip 30, according to the embodiment illustrated, is of "flat" type and FIGS. 1 and 2 make it possible to view its shape in two orthogonal planes.

Therefore, the alignment effect obtained by the spring is more noteworthy in the case of "flat" clips.

The fact that the compression spring 60 holds the threaded end 31 pressed against the threads of the tapped bore 51 also guarantees a grip facilitated between the threads during the screwing.

Figure 8A:
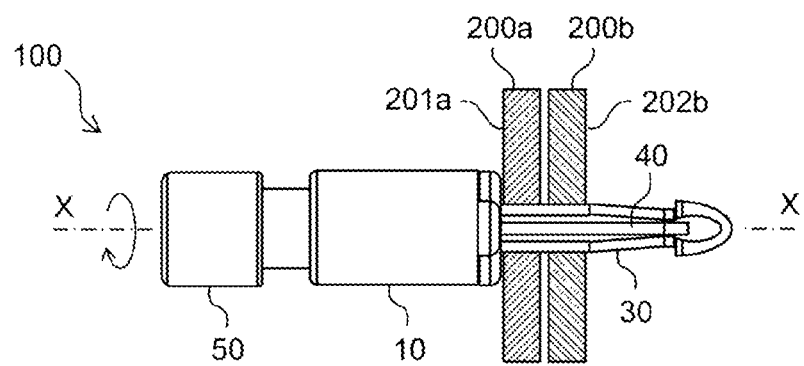
FIG. 8A: a schematic view of an insertable clamp in initial position of minimum tightening.

The clamp 100 such as described, with reference to FIG. 3, makes it possible to provisionally assemble the two parts 200a and 200b, which may moreover be of different thicknesses, in view of their final fastening by riveting for example. The clamp 100 may also be used in the case of a plurality of parts to be assembled. For this, with reference to FIGS. 1 and 8A, the clip 30 is initially introduced into the drilled holes of said parts, which are then positioned opposite one another, the clamp being in minimum tightening position with the clip in closed position. Still in minimum tightening position, the clamp 100 is introduced into the parts via its clip 30 until the bearing surface 111 of the collar 11 of the main body 10 comes into contact with a front face 201a of the first part 200a.

Subsequently, with reference to FIG. 8B, the clamp 100 is progressively tightened by the rotation of the driver nut 50, rotationally moveable in relation to the main body 10, in order to bring back the hooking spur 33 of the clip 30 applied against a rear face 202b of the second part 200b. Indeed, as explained above, the rotation of the driver nut 50 produces a translation of the clip 30 along the longitudinal direction X, due to the cooperation between the tapped bore 51 and the threaded end 31 initially engaged in said bore. The movement of the clip 30 thus corresponds to its partial removal inside the driver nut 50. The tightening of the clamp 100 is then continued until a maximum tightening position is obtained that corresponds to a firm compression of the parts 200a and 200b between the main body 10 and the hooking spur 33. In this position, the hooking spur 33 is in contact with the rear face 202b of the second part 200b by its hooking surface 331.

The hooking of the rear face 202b, or more specifically of the wall of the drilled hole of said face, of the second part 200b by the hooking spur 33 of the clip 30 is made possible by the opening of said clip as the clamp is tightened, this opening resulting by a moving apart of the branches 32 so that the width of the spur 33 at its hooking surface 331 is greater than the diameter of the drilled hole of the second part 200b wherein the clamp is introduced.

Indeed, the movement of the clip 30 and, thereby of its branches 32, in the direction going from the main body 10 to the driver nut 50 causes the branches 32 to move apart on the spreader 40, the latter remaining fixed in relation to the main body 10. The profile of the branches 32, and in particular the inner profile in contact with the spreader 40, has a shape adapted so that said branches start to move apart from one another from the start of the tightening of the clamp 100. In the example illustrated in FIG. 3, in closed position of the clip 30, the portion of the slot 34 upstream of the spur 33 not occupied by the spreader 40 has a thickness decreasing from the end of said spreader, so that the penetration of the spreader into this portion of lower thickness causes the branches 32 to move apart.

Figure 8B:
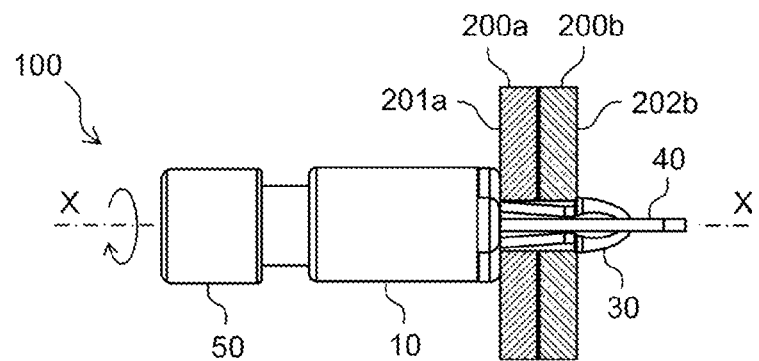
FIG. 8B: a schematic view of the clamp of FIG. 8A in final position of maximum tightening.

The moving apart of the branches 32 of the clip 30 may continue until the spreader 40 passes through the hooking spur 33 as shown in FIG. 8B.

Thus, the force exerted by the hooking spur, then in contact with the wall of the hole of the rear part of the assembly, drives it against the other parts, whereof the outer front part is abutting against the bearing surface of the main body. The parts are consequently firmly pressed.

Figure 9A:
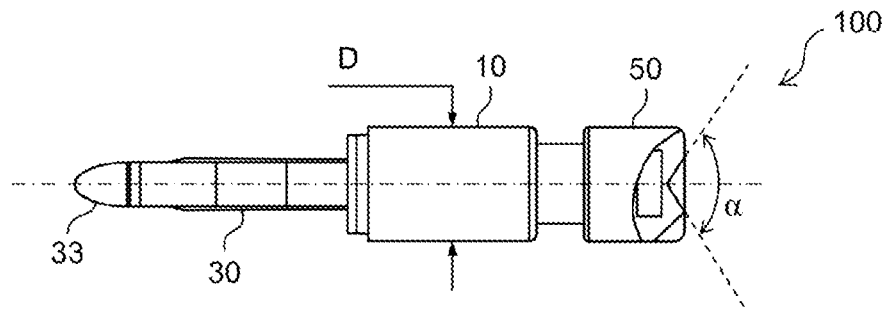
FIG. 9A: an insertable clamp according to the invention shown in partial cutaway in a first tightening position.
Figure 9B:
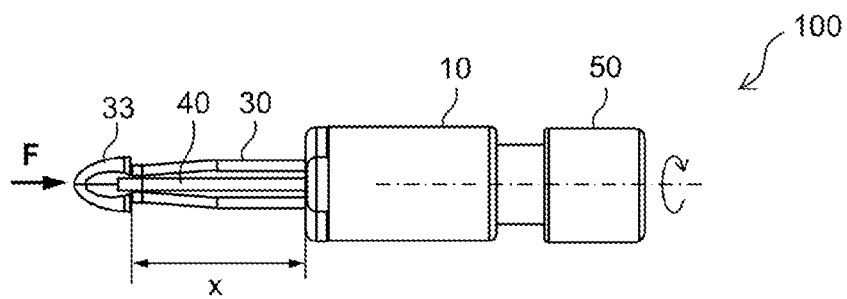
FIG. 9B: an insertable clamp according to the invention in a second tightening position.
Figure 9C:
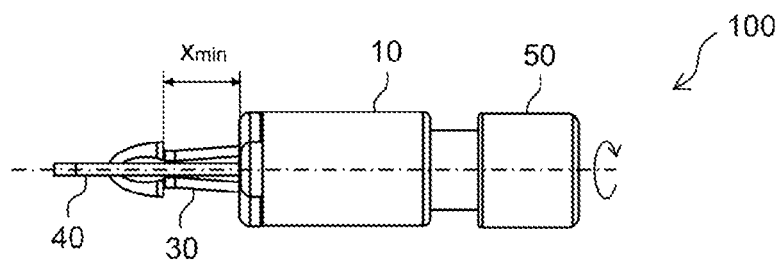
FIG. 9C: an insertable clamp according to the invention in a third tightening position.

FIGS. 9A to 9C illustrate the clamp 100 in successive tightening positions, wherein the travel x of the clip 30 progressively decreases during the tightening to reach the minimum travel $x_{min}$ corresponding to the total lowest thickness of an assembly for which the clamp 100 may be used.

Preferably, the clamp 100 has a larger diameter D, for example at its main body 10, equal to 10.5 millimeters to the nearest metric tolerances. This limited size makes it possible to mount a plurality of clamps close together in the same assembly and also to facilitate the access by means such as robotized installation modules.

In view of the present description, some elements of the invention may be produced differently or replaced by other equivalent elements without departing from the scope of the invention, this not being limited solely to the example described and illustrated. For example, the washer 72 may be fastened to the threaded end 31, or the threaded end 31 may be provided with a collar whereon the spring 60 rests in order to push back the clip 30 towards the driver nut and hold it coaxial with the main body 10.

The invention claimed is:

1. An insertable clamp, for temporary assembly of at least two drilled structural parts, the clamp including a main tubular body extending along a longitudinal axis X and having a bearing surface intended to come into contact with a first face of the structural parts, an elastic clip capable of passing through drilled aligned holes, produced in said parts, the clip being translationally moveable along the longitudinal axis, a driver nut whereby the clip is driven by the rotation of the driver nut about said axis and wherein the driver nut is provided with a tapped bore cooperating with a threaded end of said clip, the clip comprising two branches wherein each of the two branches terminate with a hooking spur intended to come into contact with a rear face of the structural parts, said branches are adapted to transversely and progressively move apart along a spreader upon rotation of the driver nut, the spreader being placed between said branches and fixed in relation to the main body, when said branches are exposed to the backward movement of the clip, characterized in that the clamp includes a compression spring placed inside the main body and holding permanently contacting and biasing the threaded end toward the tapped bore when the threaded end is not totally introduced into the tapped bore so that the clip remains constantly aligned with the longitudinal axis.

2. The clamp according to claim 1, wherein the threaded end has an annular edge against which a force is applied by the spring.

3. The clamp according to claim 2, wherein a thrust washer is positioned between the annular edge and the spring.

4. The clamp according to claim 1, wherein the bearing surface corresponds to a substantially flat annular surface of a collar interlocking by clipping into the main body.

5. The clamp according to claim 1, wherein the spreader has a T-shape and wherein the main tubular body further includes a central part placed inside the main body, perpendicular to the longitudinal axis X, and rotationally and translationally locked in relation to said body, the central part receiving in a groove a transverse end of the spreader.

6. The clamp according to claim 5 further including a washer and wherein the threaded end of the clip has an annular edge against which the spring applies a force and, wherein the compression spring is placed constrained between the central part and the annular edge of a threaded end of the washer.

7. The clamp according to claim 1, wherein the main body comprises at one of its ends, intended to come into contact with the parts to be assembled, at least one collar clipped so as to be translationally and rotationally locked in an interior of the main body.

8. The clamp according to claim 7, wherein the housing includes at least one notch extending parallel to the longitudinal axis X, a base of said notch extending perpendicular to the longitudinal axis X.

9. The clamp according to claim 8 wherein the main tubular body further includes a central part placed inside the main body, perpendicular to the longitudinal axis X, and rotationally and translationally locked in relation to said body, the central part having a groove receiving a transverse end of the spreader, the spreader having a T-shape and, wherein the central part has a regular polygonal shape having a plurality of corners in transverse cross section whereof each corner is inserted into a respective notch of the housing, the corners of said central part abutting against bases of the respective notches.

10. The clamp according to claim 1, wherein the driver nut is mounted in the main body by a pivot connection of axis X, said driver nut being translationally locked in the main body.

11. The clamp according to claim 1, wherein the threaded end remains constrained by the spring while it is not fully threaded in the tapped bore of the driver nut.

* * * * *